US008491697B2

(12) United States Patent
Watanabe et al.

(10) Patent No.: US 8,491,697 B2
(45) Date of Patent: Jul. 23, 2013

(54) METHOD FOR PRODUCING ELECTROCATALYST

(75) Inventors: Masahiro Watanabe, Kofu (JP); Hiroyuki Uchida, Kofu (JP)

(73) Assignee: Yamanashi University, Yamanashi (JP)

( * ) Notice: Subject to any disclaimer, the term of this patent is extended or adjusted under 35 U.S.C. 154(b) by 254 days.

(21) Appl. No.: 11/664,506

(22) PCT Filed: Oct. 6, 2005

(86) PCT No.: PCT/JP2005/018558
§ 371 (c)(1),
(2), (4) Date: Jun. 17, 2008

(87) PCT Pub. No.: WO2006/038676
PCT Pub. Date: Apr. 13, 2006

(65) Prior Publication Data
US 2008/0280753 A1    Nov. 13, 2008

(30) Foreign Application Priority Data
Oct. 6, 2004    (JP) .................................. 2004-294165

(51) Int. Cl.
*B22F 1/00*    (2006.01)
*B01J 21/00*    (2006.01)
(52) U.S. Cl.
USPC .................. 75/351; 75/359; 75/361; 502/100
(58) Field of Classification Search
None
See application file for complete search history.

(56) References Cited

U.S. PATENT DOCUMENTS

| 4,714,693 | A | 12/1987 | Targos |
| 4,716,087 | A | 12/1987 | Ito et al. |
| 6,413,489 | B1 | 7/2002 | Ying et al. |
| 7,335,245 | B2* | 2/2008 | He et al. .......................... 75/351 |

FOREIGN PATENT DOCUMENTS

| EP | 1338361 A1 | 8/2003 |
| EP | 1494304 * | 6/2004 |
| EP | 1579912 A2 | 9/2005 |
| JP | 62-269751 | 11/1987 |
| JP | 2000-067877 | 3/2000 |
| JP | 2001-224968 | 8/2001 |
| JP | 2002-216776 | 8/2002 |
| JP | 2003-226901 | 8/2003 |
| JP | 2003288905 A | 10/2003 |
| JP | 2004-185830 * | 7/2004 |
| WO | WO 2004/108330 * | 12/2004 |
| WO | 2005/063391 A1 | 7/2005 |

OTHER PUBLICATIONS

Burda, Clemens et al. "Chemistry and Properties of Nanocrystals of Different Shapes". Chem Rev. 105, 1025-1102 (2005).*

(Continued)

*Primary Examiner* — Melvin C Mayes
*Assistant Examiner* — Sheng H Davis
(74) *Attorney, Agent, or Firm* — Browdy and Neimark, PLLC

(57) ABSTRACT

[Problem]To provide a method for producing an electrocatalyst having no compositional scatter, wherein nano-level alloy catalyst molecules with an ordered particle size are supported in a highly dispersed state. [Means of Solution] The method includes the steps of preparing a reverse micelle solution by mixing two or more catalyst precursors selected from among metal salts and/or metal complexes, a solvent having hydrophilic groups and a non-aqueous solvent, forming alloy particles in the reverse micelle by adding a non-aqueous solution having a reducing action to the reverse micelle and heating, and supporting the alloy particles on a carrier.

18 Claims, 10 Drawing Sheets

OTHER PUBLICATIONS

Supplementary European Search Report dated Oct. 28, 2010.
Kinashita et al., Magnetic evaluation of nanostructure of gold-iron composite particles synthesized by a reverse micelle method, Journal of Alloys and Compounds, 359(1-2):46-50 (2003).

Kumbhar et al., Magnetic properties of cobalt and cobalt-platinum alloy nanoparticles synthesized via microemulsion technique, IEEE Transactions on Magnetics, 27:4 (2001).

* cited by examiner (Magnification 500,000 times)

(Magnification 2,000,000 times)

METHOD FOR PRODUCING ELECTROCATALYST

TECHNICAL FIELD

The present invention relates to a method for producing electrocatalysts used in a polymer type fuel cells.

BACKGROUND ART

Supported metal catalysts are used in various fields such as petrochemistry, oil refining, environmental products and fuel cells. In polymer electrolyte fuel cells (PEFCs), research and development are focusing on electric vehicles, stationary cogeneration and power for portable devices.

The electrocatalyst may consist of an active metal based on platinum supported on a carrier of a conductor such as carbon and so on. The catalyst performance depends on the degree of dispersion of the active metal. For a given amount of active metal, catalyst performance increases with increasing surface area. In order to reduce the loading amount of expensive platinum, the catalyst should preferably be used in particulate form. Hence, a highly dispersed catalyst is desired.

The electrocatalyst may be manufactured, as shown for example in the following Patent Reference 1, by reducing a chloroplatinic acid solution to prepare a metal colloidal solution, followed by supporting it on a carrier. A method for producing an alloy catalyst with platinum is shown, for example in the following Patent Reference 2, wherein alloy particulates are obtained by reducing an organic protecting agent with alcohol.

Patent Reference 1: JP-A 2001-224968,
Patent Reference 2: JP-A 2003-226901

In addition to reducing platinum as described above, in fuel electrodes (anode), the use of an alloy catalyst to increase carbon monoxide poisoning tolerance is now being studied. An alloy catalyst is important not only in fuel electrodes but also to improve the oxygen reduction activities at air electrodes(cathode). Examples of an alloy catalyst are platinum with iron, cobalt and ruthenium.

In the conventional manufacturing method of an alloy catalyst, a metal salt solution was added on platinum particles already supported on carbon by an impregnation process etc., followed by reducing at a high temperature of about 900° C. When the particles were supported on carbon using a metal salt as the metal, an alloy was manufactured by reduction with an alcohol. However, in the alloy catalyst obtained by such a process, the particle size of the catalyst particles might be irregular, the composition of each particle might not be uniform due to the difference in reducibility, aggregation of platinum particles might take place due to high temperature heating, and a catalyst containing highly dispersed nano-level particles could not then be obtained.

DISCLOSURE OF THE INVENTION

Problem to be Solved by the Invention

It is therefore an object of the invention to provide a method for producing a highly dispersed electrocatalyst with uniform alloy composition, and narrow particle size distribution (monodispersed state).

Means for Solving Problem

The Inventors discovered that it was possible to form alloy catalyst particles by a reduction reaction of several kinds of catalyst precursors encapsulated in a reverse micelle and then mixing them with a carrier to support them, and hence solved the above problem.

The Inventors discovered that the above object could be attained by including the carrier beforehand when preparing the reverse micelle solution and immediately supporting the alloy catalyst particles, which were formed by reduction of the precursors in reverse micelle, on the carrier, and thereby arrived at the present invention.

A first method for producing the electrocatalyst of the invention therefore includes the steps of: preparing a reversed micelle solution by mixing two or more catalyst precursors selected from among metal salts and/or metal complexes, a solvent having hydrophilic groups, and a non-aqueous solvent, forming alloy particles in a reverse micelle by adding a non-aqueous solution to the reverse micelle solution and heating, and supporting the alloy particles on a carrier.

A second method for producing the electrocatalyst of the invention includes the steps of: preparing a reverse micelle solution containing a carrier by mixing two or more catalyst precursors selected from among metal salt and/or metal complexes, a solvent having hydrophilic groups, a non-aqueous solvent and the carrier; and forming alloy particles in the reverse micelle by adding a non-aqueous solution having a reducing action to the above reverse micelle solution and heating, and supporting the alloy particles on the carrier. In other words, the second method for producing the electrocatalyst has the characteristic that one step can be skipped compared with the first producing method.

The method for producing the electrocatalyst according to the invention includes the steps of, after forming alloy particles inside the reverse micelle, partially removing molecules enclosing the alloy particles which constitute the reversed micelle, and, after supporting the alloy particles on the carrier, removing the micelle component remaining on the alloy particles.

Effect of the Invention

According to the method for producing an electrocatalyst relating to the invention, an electrocatalyst, wherein high quality nano-level alloy catalyst particles of uniform particle size and composition are supported in a highly dispersed form, can be obtained. In the invention, alloy catalyst particles having a composition ratio depending on the mixing ratio of plural types of metal atoms prior to the alloy forming reaction, can be obtained.

After forming the alloy particles, by performing the step to partially remove organic molecules (the reverse micelle component) surrounding the alloy particles, the alloy particles can be highly dispersed on the carrier with ease. After supporting the alloy particles, catalyst activity can be further enhanced by removing the reverse micelle component remaining on the alloy particles.

BEST MODE FOR CARRYING OUT THE INVENTION

Figure 1:
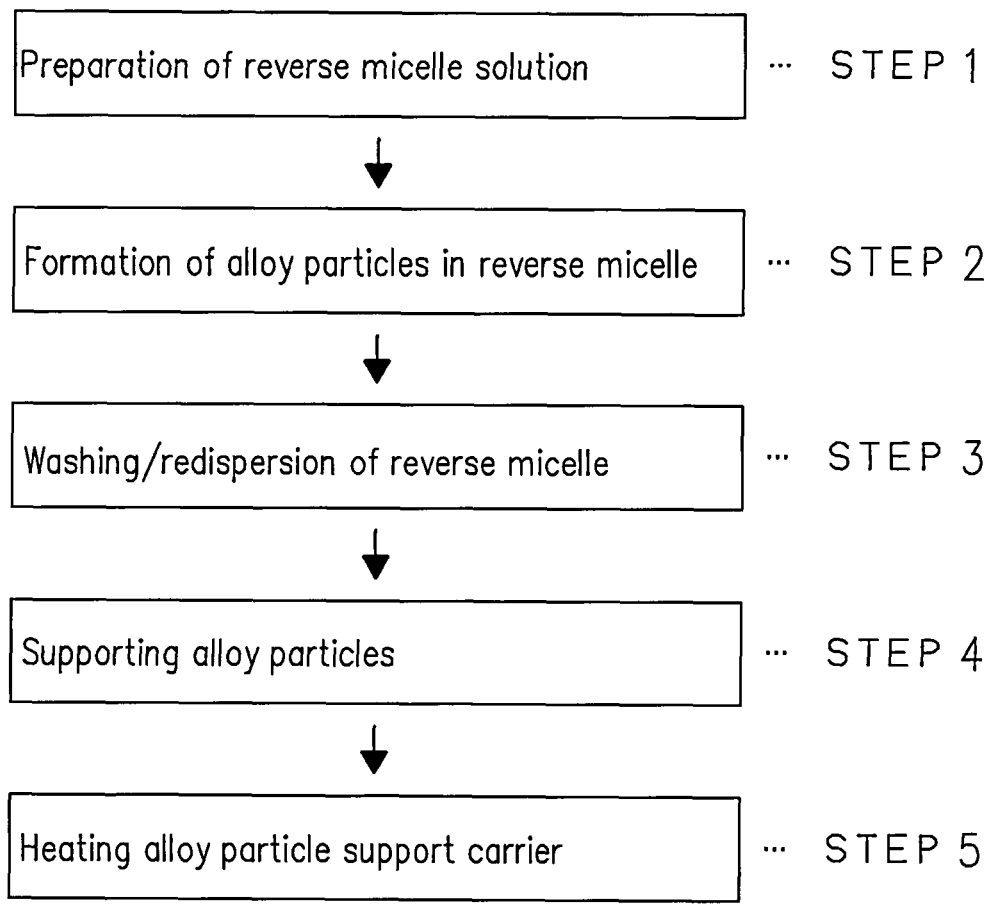
FIG. 1 is a flowchart of the catalyst production method of the invention.

A first producing method will now be described referring to the flowchart of FIG. 1. First, a reversed micelle solution is prepared in Step 1. The aforesaid catalyst precursor is a compound having a starting material for forming alloy particles by reduction, specifically two or more metal salts or metal complexes, and their combination is not particularly limited as long as they are metal salts or metal complexes having catalytic activity.

Examples of the catalyst precursor are noble metals such as platinum, palladium, gold, ruthenium, iridium and rhodium, or an inorganic or organic metal complex of these noble metals. Salts of base metals such as iron, cobalt, nickel, and manganese, chromium, vanadium, titanium, niobium, molybdenum, lead and tungsten, or an inorganic or organic complex of these base metals, are included. From the viewpoint of its excellent catalytic activity, as a noble metal, platinum is particularly preferred. As metal complexes of platinum and platinum salts, platinum acetylacetonate [$Pt(acac)_2$] and potassium chloroplatinate ($K_2PtCl_4$) are preferred. Examples of salts of base metals are iron chloride and nickel chloride, and amine complexes, ethylene diamine complexes and acetyl acetonate complexes thereof may also be used. From the viewpoint of poisoning resistance to carbon monoxide in fuel gas and improvement of oxygen reduction activity, a palladium alloy is also preferred.

As for the mixing ratio of these plural metal salts or metal complexes, the blending ratio (atomic ratio) may be selected depending on the desired alloy composition.

Examples of metals and atomic ratios in alloys having excellent poisoning resistance to carbon monoxide are $Pt_{50}Ru_{50}$, $Pt_{67}MO_{33}$, $Pt_{76}Ni_{24}$ and $Pt_{85}Fe_{15}$. Examples of metals and atomic ratios in alloys having excellent oxygen reduction activity are $Pt_{50}Fe_{50}$, $Pt_{42}Fe_{58}$, $Pt_{67}Co_{33}$, $Pt_{78}Ni_{22}$ and $Pt_{48}V_{52}$.

Examples of a solvent having hydrophilic groups are organic solvents having a hydroxyl group, such as a higher alcohol. The solvent having a hydrophilic group may be suitably selected from among those which can form a reverse micelle in a non-aqueous solvent, in which the catalyst precursor has excellent solubility, and which can withstand the heating conditions during the reduction for forming the alloy described later. Specifically, a solvent having a boiling point of 150° C. to 300° C. is preferred, for example hexadecane diol and octadecane diol.

Examples of the non-aqueous solvent are organic solvents which can form a reverse micelle by mixing with the aforesaid solvent having a hydrophilic group, for example higher ethers, aromatic ethers and higher esters. In a non-aqueous solvent, in view of the stability of the reverse micelle and heating conditions during the reduction for forming alloy particles described later, a solvent having a boiling point of about 150° C. to 300° C. is preferred, for example diphenyl ether, dioctyl ether and dinonyl ester.

The mixing ratio of the solvent having the hydrophilic group and the non-aqueous solvent is suitably selected so that a stable reverse micelle solution can be formed. For example, the non-aqueous solvent is mixed in a ratio of 10 to 100 times in terms of molar ratio relative to the solvent having a hydrophilic group.

In the step for preparing the reverse micelle solution, in order to form a stable reverse micelle, it is preferred to further add a higher aliphatic carboxylic acid and higher aliphatic amine.

Examples of higher aliphatic carboxylic acids which are preferred are compounds having 6 to 22 carbon atoms such as oleic acid, decanoic acid and pentadecanoic acid. Examples of higher aliphatic amines which are preferred are compounds having 6 to 22 carbon atoms such as oleylamine, decanamine and pentadecanamine.

As the higher aliphatic carboxylic acid and higher aliphatic amide, a mixture of oleic acid and oleylamine is particularly preferred for stabilizing the reverse micelle, and for example an equimolar mixture can be used.

In order to uniformly mix the reverse micelle solution to which this higher aliphatic carboxylic acid and higher aliphatic amine were added, it is preferred to stir at about 100° C. to about 200° C.

When mixing the metal salt or metal complex and a solvent having a hydrophilic group and a non-aqueous solvent, or mixing the higher aliphatic carboxylic acid and higher aliphatic amine, stirring is preferably performed with suitable heating in order to improve the fluid properties of the mixed solution. It is preferred to perform the mixing under an inert gas such as nitrogen.

When for example platinum acetyl acetonate, ferrous (II) chloride, 1,2-hexadecane diol and phenyl ether are mixed together, a more stable reverse micelle solution can be obtained by mixing while heating to about 100° C., adding oleic acid and oleylamine, and then mixing while heating to about 200° C.

After obtaining the reverse micelle solution, as shown in Step 2 of FIG. 1, a non-aqueous solution which has a reducing action is added, and the metal salt or metal complex in the reverse micelle is reduced by heating to obtain alloy particles. Specifically, in the present invention, the alloy particles are formed by enclosing metal salts or metal complexes for obtaining an alloy having a desired composition in a reverse micelle having a small particle size, and supplying a reducing agent from outside the reverse micelle while heating to reduce them and convert them to an alloy. In this way, alloy particles of nanoorder having a size controlled to about 3 nm and having a stable composition, can be obtained.

The non-aqueous solution having a reducing action (hereafter referred to also simply as reducing agent) may be for example a non-aqueous solution containing $MBR_3H$, MH (where M is lithium, sodium, or potassium, R is a hydrogen atom or a hydrocarbon group, the hydrocarbon group being straight-chain or branched, and saturated or unsaturated), and a metal dielectric of an alcohol or naphthalene.

These may be an organic solvent solution having a reducing activity, or an organic solvent which itself has a reducing activity. A tetrahydrofuran (THF) solution of $LiB(C_2H_5)_3H$, a diethylether solution of $LiB(CH_3)_3H$, are preferably used.

The amount of the reducing agent added is preferably 1 to 3 times in terms of molar ratio relative to the total amount of metal salt.

The addition of the non-aqueous solution having a reducing activity is performed for example by gradually dropping in the reverse micelle solution while stirring with a stirrer, but any mixing means known in the art may be used.

The heating temperature for reducing and converting to alloy depends on the type of alloy desired, but it is preferably about 200° C. to 300° C. At less than 200° C., complete conversion to alloy cannot be performed, and if it exceeds 300° C., there is a risk that alloy particles may aggregate together.

For example, when a THF solution of $LiB(C_2H_5)_3H$ is added to a reverse micelle solution comprising platinum acetyl acetonate, iron (II) chloride, 1,2-hexadecane diol, diphenyl ether, oleic acid and oleylamine, the THF solution is preferably gradually dripped into the reverse micelle solution which is stirred at 200° C., and the reduction reaction performed by increasing the temperature to about 260° C.

In the invention, the type of metal salt or metal complex, type of solvent and temperature of the reduction reaction are suitably selected depending on the conditions for manufacturing the desired alloy. For example, the solvent used is suitably selected depending on the solubility of the metal salt, the stability of the reverse micelle which is formed and the heating temperature in the reduction reaction.

The alloy particles formed in the reverse micelle as described above are next supported on a conducting carrier (FIG. 1, Step 4). Prior to the carrier step, a step is preferably performed wherein a solution containing a lower alcohol, preferably ethanol or methanol, is mixed with the reverse micelle solution, a precipitate containing the alloy particles is separated by centrifugation, and this precipitate is redispersed in an organic solvent such as hexane (FIG. 1, Step 3). By performing this step, any reducing agent remaining in the reverse micelle solution after the reduction reaction can be washed out. Also, it is thought that since the organic molecules (reverse micelle component) surrounding the alloy particles can be partially removed, and the adsorption of alloy particles on the carrier can be enhanced while maintaining the repulsion effect between micelle due to the hydrophobic groups outside the reverse micelle, the alloy particles can be easily supported. In other words, alloy particles can be supported on the carrier while avoiding coalescence between alloy particles.

The conductive carrier that supports the alloy particles is not particularly limited, examples being carbon black, amorphous carbon, carbon nanotube, carbon nanohorn and tin oxide nanoparticles.

When supporting the particles, the reverse micelle containing the alloy particles may be mixed with the carrier by an ordinary method while stirring. The mixing is preferably performed while dripping the reverse micelle solution into a solution in which the carrier is dispersed, into a lower alcohol such as ethanol or methanol. Since the reverse micelle has hydrophobic groups outside, it is distributed on the carrier surface without the particles coming too close to each other due to their mutual repulsion resulting from the charge on the hydrophobic groups, and therefore the alloy particles can be highly dispersed on the carrier.

After adsorbing the alloy particles on the carrier surface, heat treatment is preferably performed (FIG. 1, Step 5). Due to this, reverse micelle components remaining on the alloy particles can be completely decomposed and eliminated. These remaining reverse micelle components may contain for example hydrophobic groups such as alkyl groups.

The heat treatment is preferably performed under an inert gas, such as argon, nitrogen or helium. The temperature of the heat treatment varies according to the type of metal forming the alloy, the metal salt or metal complex which is the starting material and the reagents used, but it is preferably a temperature at which the reverse micelle components decompose, at which the decomposition reaction does not proceed too slowly and which is less than the temperature at which alloy particles coalesce. For example, it is preferably about 100° C. to 400° C., and more preferably about 180° C. to 250° C. The heat treatment time is preferably a time in which alloy particles do not coalesce. For example, in the case of the platinum iron alloy particles mentioned above, heat treatment is preferably performed at a temperature of about 180° C. to 230° C. for about three to five hours.

Next, a second method for producing an electrocatalyst according to the invention will be described. In the second producing method, in Step 1 of the first producing method, i.e. the step wherein two or more metal salt or metal complexes forming the catalyst precursor are mixed with a solvent having hydrophilic groups and a non-aqueous solvent so as to prepare a reverse micelle solution, the carrier is mixed together to prepare a reverse micelle solution containing the carrier. Hence, by mixing the carrier together, the alloy particles formed in the reverse micelle in the next Step 2 can be immediately supported on the carrier, and one step can effectively be omitted as compared to the first producing method.

In the second producing method, the producing technique and other details are basically identical to the first producing method except that the carrier is mixed together in Step 1. Therefore, the type of carrier mixed in Step 1, as in the first producing method, may be a conductive carrier such as carbon black, amorphous carbon, carbon nanotube, carbon nanohorn and tin oxide nanoparticles. The type of metal salt or metal complex in Step 1, the type and mixing proportion of solvent having hydrophilic groups and non-aqueous solvent, and the mixing of the higher aliphatic carboxylic acid and higher aliphatic amine, are also identical. Since the type and addition amount of non-aqueous solution having a reducing action which is added in Step 2, and the reaction temperature during the reduction/alloy conversion, are identical to those of the first producing method, their detailed description will be omitted. When the obtained alloy particles are supported on the carrier, the conditions when treating the reverse micelle with a solvent containing alcohol, and heating the carrier after supporting the alloy particles thereupon, are also identical to those of the first producing method.

As described above, according to the second producing method, the carrier is placed in the reverse micelle solution beforehand so that it can act as a carrier simultaneously with the reduction taking place in the reactor. Hence, by containing the carrier in the solution forming the reverse micelle, a uniform dispersion state is obtained wherein the alloy component metal is not a solid but is in an ionic state enclosed in the reverse micelle co-present with the carrier. In other words, the metal ions forming the reverse micelle are uniformly adsorbed on the carrier due to the electrostatic forces in the solution, and due to the state of the reverse micelle, mutual coalescence of particles can be suppressed, so the particles are uniformly supported on the carrier.

EXAMPLES

Example 1

Figure 2:
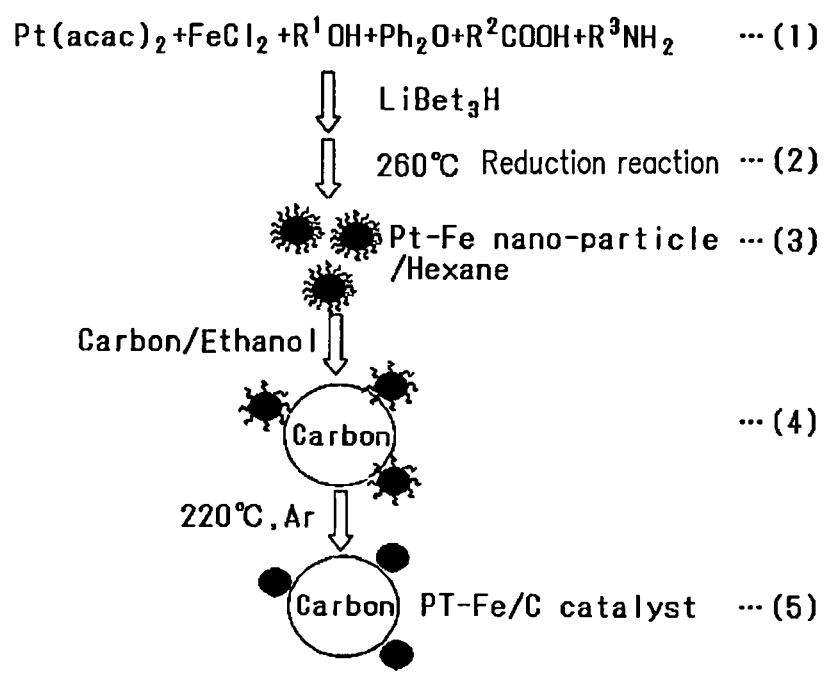
FIG. 2 is a descriptive diagram of a catalyst production method of a first embodiment.

Hereinafter, a first method for producing the electrocatalyst of the invention will be described in detail by describing Example 1, referring to FIG. 2. In FIG. 2, 1,2-hexadecane diol is represented by $R^1OH$, phenylether is represented by $PH_2O$, oleic acid is represented by $R^2COOH$, oleylamine is represented by $R^3NH_2$, and $LiB(C_2H_5)_3H$ is represented by $LiBet_3H$.

(1) Preparation of reverse micelle solution 0.5 mmol (197mg) Pt(acac)$_2$, 0.5 mmol (99.3 mg) FeCl$_2$.4H$_2$O, 2 mmol (520mg) 1,2-hexadecane diol and 25 ml diphenylether were mixed in a beaker, the temperature was elevated to 100° C. and the mixture was stirred using a stirrer for 10 minutes. After the addition of 0.5 mmol (0.17 ml) oleic acid and 0.5 mmol (0.16 ml) oleylamine, the temperature was elevated to 200° C. while being stirred for 20 minutes, resulting in a reverse micelle solution.

(2) Formation of alloy particles 2.5 ml (2.5 mmol) of 1 M LiB(C$_2$H$_5$)$_3$H in THF solution was gradually dripped into the obtained reverse micelle solution for two minutes, and after being stirred for five minutes, the temperature was elevated to 260° C., a reduction reaction was performed while heating under reflux for 20 minutes at this temperature. Thus, Pt-Fe alloy particles were obtained in the reverse micelle. Steps (1) and (2) were performed under nitrogen gas.

(3) Washing and separation of alloy particles, and preparation of redispersed solution After cooling to room temperature, 40 ml of ethanol was added and mixed, the mixture was centrifuged (7000 rpm, 15 minutes), and Pt-Fe particles were thus obtained as a black precipitate. A mixture comprising 0.05 ml oleic acid, 0.02 ml oleylamine and 20 ml hexane was then added, and the Pt-Fe particles were redispersed as reverse micelle particles. 20 ml ethanol was then added to this dispersion, the same procedure was repeated, and Pt-Fe particles were again redispersed in the oleic acid/oleylamine/hexane solution. By this procedure, a reverse micelle solution of Pt-Fe particles from which reducing agent, unreacted metal salt and metal complexes had been removed, was obtained.

(4) Support of alloy particles

A mixed solution of 20 ml (containing 98 mg Pt, 28 mg Fe) of the reverse micelle solution with Pt-Fe particles obtained in the above Step (3) and 20 ml ethanol, was dripped into an ink-like suspension obtained by dispersing 364 mg of Ketjen Black EC, Lion Corporation, in 40 ml ethanol with ultrasonication for 30 minutes under stirring by a stirrer. The ethanol-treated reverse micelle particles are easily adsorbed on carbon black, and are easily highly dispersed. This is thought to be because, as shown in (4) of FIG. 2, the particles forming the reverse micelle have been partially removed as compared to the state prior to Step (4), and adsorption on carbon black is easier when the repulsive forces of the hydrophobic groups of the molecules remain. The carrier amount of platinum was 20 wt% relative to carbon black.

(5) Heat treatment

The alloy particle supporting carrier obtained in the aforesaid Step (4) was heated in argon gas at 220° C. for four hours, and an electrocatalyst was thus obtained.

Test Examples

Hereafter, the properties of catalyst particles (alloy particles), which were supported on carbon black obtained in Step (4) of Example 1 and heat-treated at different temperatures in Step (5), were examined.

(1) Thermogravimetric analysis

Figure 3:
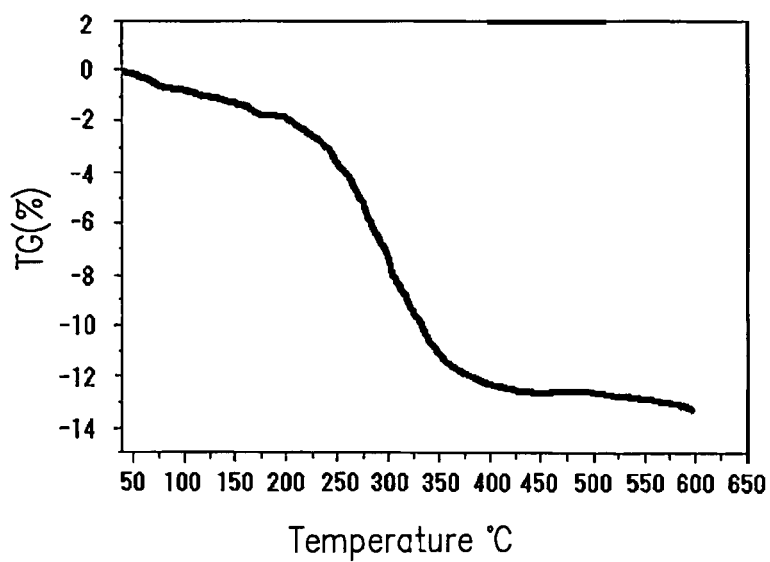
FIG. 3 is a graph showing a thermogravimetry result in Test Example 1.

FIG. 3 shows the weight change when the carbon black catalyst on which the alloy particles were supported was heated in argon gas. Heating was performed at a slow heating rate at 5° C. at a time per minute, and the thermogravimetric (TG: weight change versus temperature) weight change characteristics were measured.

In this graph, the weight begins to decrease near 100° C., decreases sharply near 180° C., and after 400° C. it effectively levels off at approximately—13 %. In (5) of Example 1, when the weight change was measured even for a catalyst which had been heated to 220° C. for four hours, it was found that the weight change was approximately—12.5%, which was effectively the same as the constant value arrived at after flattening out in the graph of FIG. 3.

(2) Lattice parameter and particle size of alloy catalyst particles

X-ray diffraction measurements were performed for carbon black on which the alloy particles were supported in Step (4) of Example 1, followed by heating to 220° C. and 400° C., respectively. The lattice parameter and particle size of the alloy particles were calculated. TABLE 1 shows the results.

TABLE 1

| Heating temperature (° C.) | Lattice Parameter (Å) | Particle Size (nm) |
|---|---|---|
| No heating | 3.892 | 2.78 |
| 220° C. | 3.888 | 2.82 |
| 400° C. | 3.834 | 3.16 |

It was found that the crystal structure of Pt—Fe alloy was a face-centered cubic structure, which is identical to that of pure platinum. The lattice parameter was approximately 3.89 to 3.83 Å regardless of heat treatment, which was smaller than the lattice parameter of 3.93 for pure platinum. This fact indicates alloy formation with iron which has a smaller atomic radius than that of platinum. Also, the particle size was approximately 2.8 nm even with heating to 220° C., which was practically the same value as that prior to heating. Even after the organic increased to 400° C., the particle size exceeded 3 nm, and it was considered that if heating was continued beyond this temperature, there was a risk that increase of particle size due to coalescence of alloy particles might become significant.

(3) Crystal Structure of Alloy Particles

X-ray diffraction analysis was performed for carbon black on which the alloy particles obtained in Step (4) of Example 1 were supported, varying the heat treatment temperature of the alloy particles, and the crystal structure of the alloy particles was examined. As a result, it was found that when the heating temperature exceeded 400° C., a regular alloy was formed. From the viewpoint of durability, irregular alloy particles are preferred, so it was concluded that the heating in Step (5) was preferably performed at a temperature of 400° C. or less.

(4) Analysis by Transmission Electron Microscope (TEM)

Figure 4:
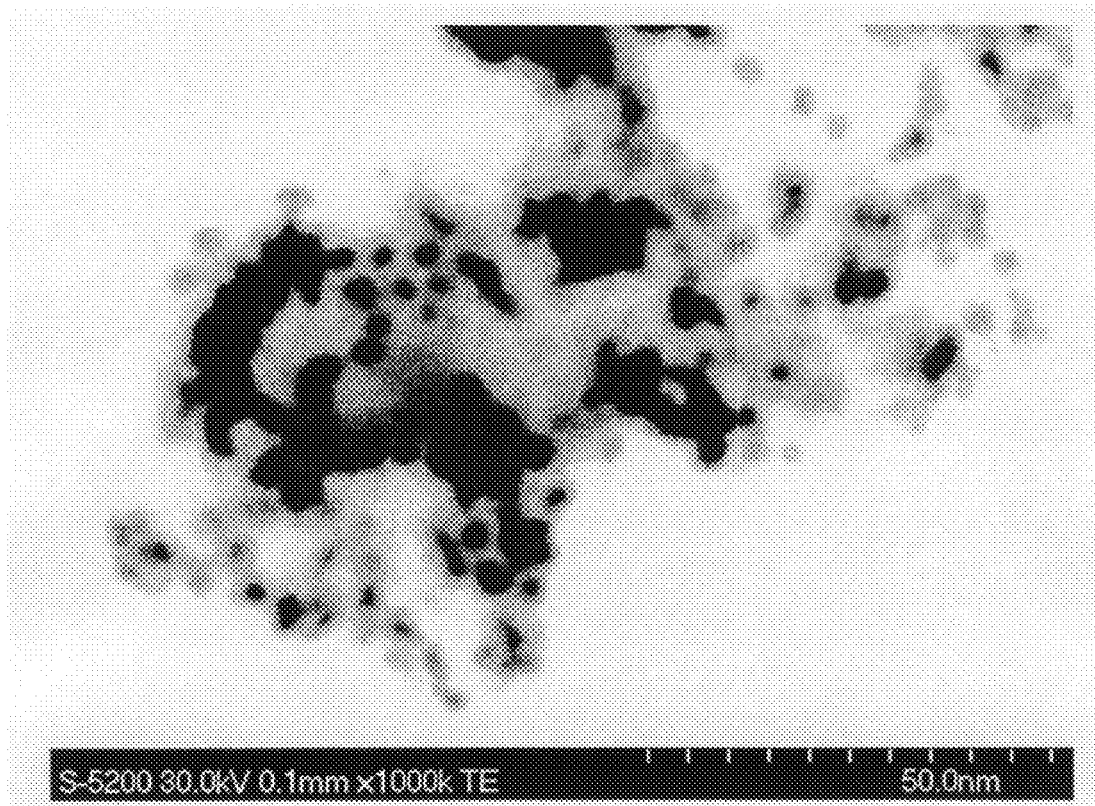
FIG. 4 is an electron micrograph in Test Example 4.
Figure 5:
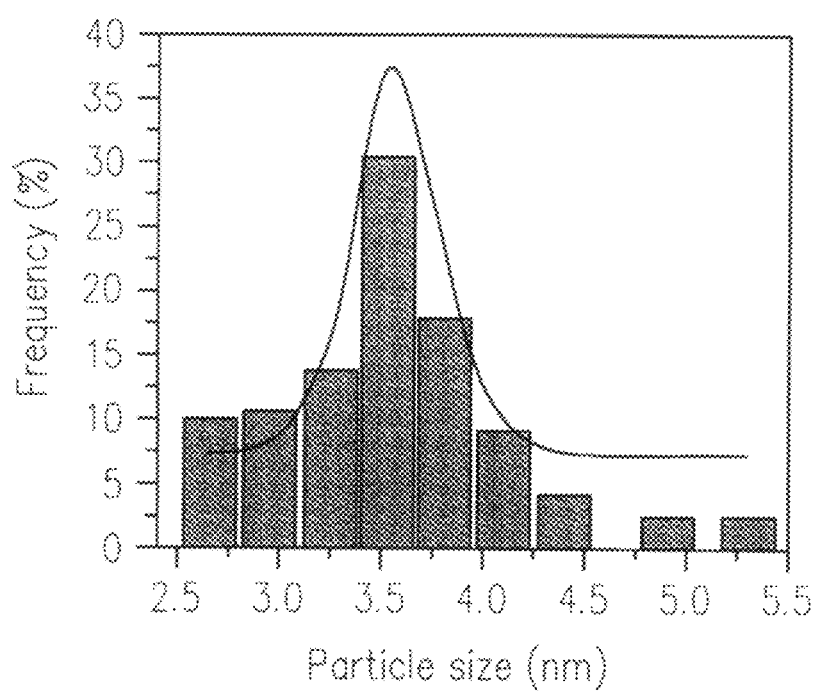
FIG. 5 is a graph of particle size distribution according to Test Example 4.

The surface of carbon black on which the alloy particles obtained in Step (4) of Example 1 were supported, was examined by TEM for carbon black which had not been heated and for carbon black which had been heated to 220° C. in Step (5). As a result, it was found that even if the carbon black was heated in argon gas to 220° C. to decompose and remove the reverse micelle component remaining on the alloy particles were removed by the heat treatment, a high dispersion support was obtained without coalescence and the scatter of particle size was small, as shown in the TEM photograph of FIG. 4 and the particle. distribution graph of FIG. 5.

(5) Performance test of electrocatalyst

Figure 6:
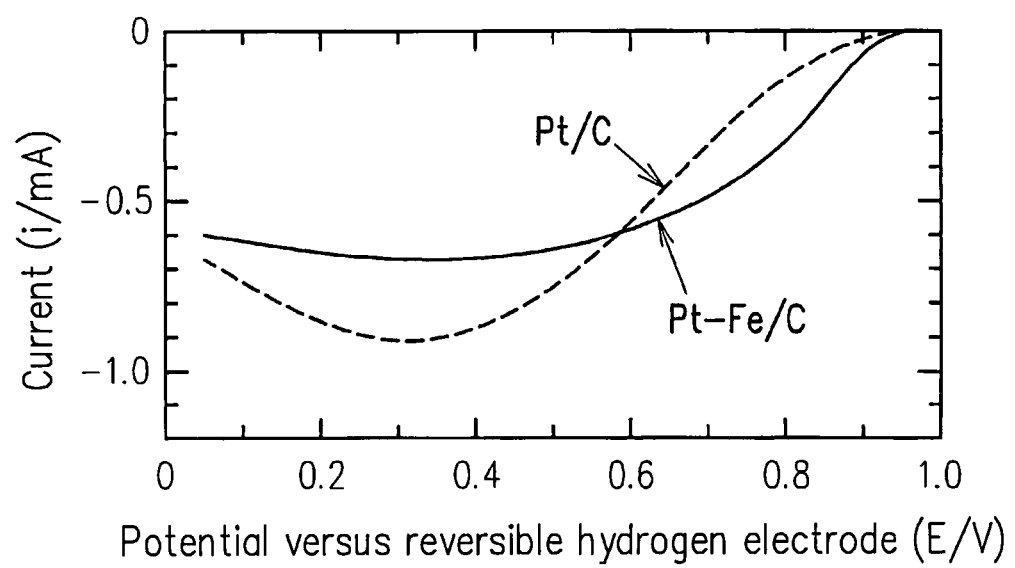
FIG. 6 is a graph of current-potential characteristics according to Test Example 5.

The oxygen reduction activity of a Pt-Fe alloy supported carbon black catalyst (Pt-Fe/C) obtained in Step (5) of Example 1, followed by heating to 220° C. in argon gas, was measured by the rotating electrode method (RDE). A Pt-Fe/C powder was uniformly fixed on the surface of a glassy carbon elliptical electrode (GC). As a control, a Pt/C powder wherein only platinum, obtained in an identical way except that the reverse micelle solution was prepared using only platinum acetyl acetonate as the metal complex, was supported on carbon black, was fixed in an identical way to a GC. The relation between current and voltage was measured while rotating the electrode in a 0.1M $HClO_4$ electrolyte solution saturated with air. FIG. 6 shows the current-voltage characteristics (countercurrent voltammogram) at 25° C. From the results of FIG. 6, it was found that the voltage at which an oxygen reduction reaction current of Pt-Fe/C commences to flow shifted to the positive direction by approximately 50 mV compared to Pt/C, also the current increased sharply.

Hence, the oxygen reduction activity was enhanced at Pt-Fe alloy catalyst. Measurements were repeated while varying the rotation speed, and the kinetically controlled current density $J_k$ was calculated by extrapolating the rotating rate to infinity. TABLE 2 shows the results. The loading amount of Pt on carbon black was 17 wt% and that of Pt-Fe on carbon black was 20 wt%. Because, $J_k$ is the actual current density per catalyst active surface area, the small difference in the catalyst loading is completely compensated. At a practical fuel cell operation potential of 760 mV, it was found that $J_k$ for Pt-Fe/C having an atomic ratio of 1:1 ($Pt_{50}Fe_{50}$), was approximately 2.5 times higher than that for Pt/C.

TABLE 2

| Catalyst | $J_k$/mA cm$^{-2}$ |
|---|---|
| Pt (17 wt %)/C | 0.86 |
| Pt—Fe (20 wt %)/C | 2.25 |

(6) Compositional ratio of alloy particles

In the above examples, as a result of performing an ICP (high-frequency induction coupled plasma) spectroscopic analysis of the compositional ratio of the alloy particles, Pt:Fe was 52:48, which, taking account of experimental error, was the same as the metal ratio of 50:50 in the alloy prior to reaction.

Example 2

Next, a second method for producing an electrocatalyst according to the invention based on Example 2, will be described in detail.

(1) Preparation of Reverse Micelle Solution with Added Carrier 0.5 mmol (197 mg) Pt(acac)$_2$, 0.5 mmol (100 mg) $FeCl_2.4H_2O$, 2 mmol (520 mg) 1,2-hexadecane diol and 25 ml phenylether were mixed in a beaker, the temperature was raised to 100° C. and the mixture stirred using a stirrer for 10 minutes. After 1.0 mmol (0.34 ml) oleic acid and 1 mmol (0.32 ml) oleylamine were added thereto, 300 mg of Ketjen Black EC, Lion Corporation, was added as a carrier, the temperature of the solution after addition was increased to 200° C., stirring was continued for 20 minutes, and a reverse micelle solution containing the carrier was thus obtained.

(2) Formation of Alloy Particles and Support on the Carrier 2 ml (2 mmol) of 1 M LiB(C$_2$H$_5$)$_3$H.THF solution was gradually dripped into the obtained reverse micelle solution for two minutes, and after stirring for five minutes, the temperature was increased to 260° C., a reduction reaction was performed while heating under reflux for 20 minutes at this temperature, and Pt—Fe alloy particles were thus obtained in the reverse micelle and supported on a carrier of carbon black. These steps were also performed under nitrogen gas.

(3) Rinsing/Separation of Pt—Fe Support Catalyst

The mixed solution containing the Pt—Fe support catalyst obtained in Step (2) was cooled to room temperature, and filtered to separate the Pt—Fe support catalyst particles. Next, they were thoroughly rinsed with ethanol, and dried at 60° C.

(4) Heat Treatment

The Pt—Fe support catalyst obtained in Step (3) was heated to 220° C. in argon gas for four hours, and the remaining solvent was evaporated to obtain a Pt—Fe electrocatalyst.

Example 3

An electrocatalyst was obtained by a method identical to that of Example 2, except that 177 mg Fe(acac)$_3$ was used as Fe starting material.

Example 4

In Example 4, a Pt—Co electrocatalyst was manufactured. The electrocatalyst was obtained by a method identical to that of Example 2, except that 100 mg of CoCl$_2$.6H$_2$O was used as Co starting material.

Example 5

In Example 5, a Pt—V electrocatalyst was manufactured. The electrocatalyst was obtained by a method identical to that of Example 2, except that 174 mg V(acac)$_3$ was used as V starting material.

X-ray diffraction analysis of the catalyst particles prepared in the aforesaid Examples 2 to 5 was performed, and the lattice parameter, particle size and activity control current density $J_k$ representing the electrode performance of the catalyst, were calculated. TABLE 3 shows the results.

TABLE 3

| Example catalyst | Lattice Parameter (Å) | Particle Size (nm) | $J_k$/mAcm$^{-2}$ |
|---|---|---|---|
| Example 2 | 3.87 | 4.8 | 2.90 |
| Example 3 | 3.83 | 2.4 | 2.23 |
| Example 4 | 3.82 | 5.3 | 1.98 |
| Example 5 | 3.91 | 5.1 | 2.73 |

It is seen that the lattice parameters for all the catalysts in Examples 2 to 5 are less than the lattice parameter of 3.93 Å for pure Pt, and that they form alloys. The particle size was 2.4 to 5.3 nm. Further, whereas $J_k$ which represents the electrode performance of the catalyst was 0.86 mAcm$^{-2}$ (TABLE 2) for Pt alone, it was 2.3 to 3.4 times higher than this value for the alloys.

Figure 7:
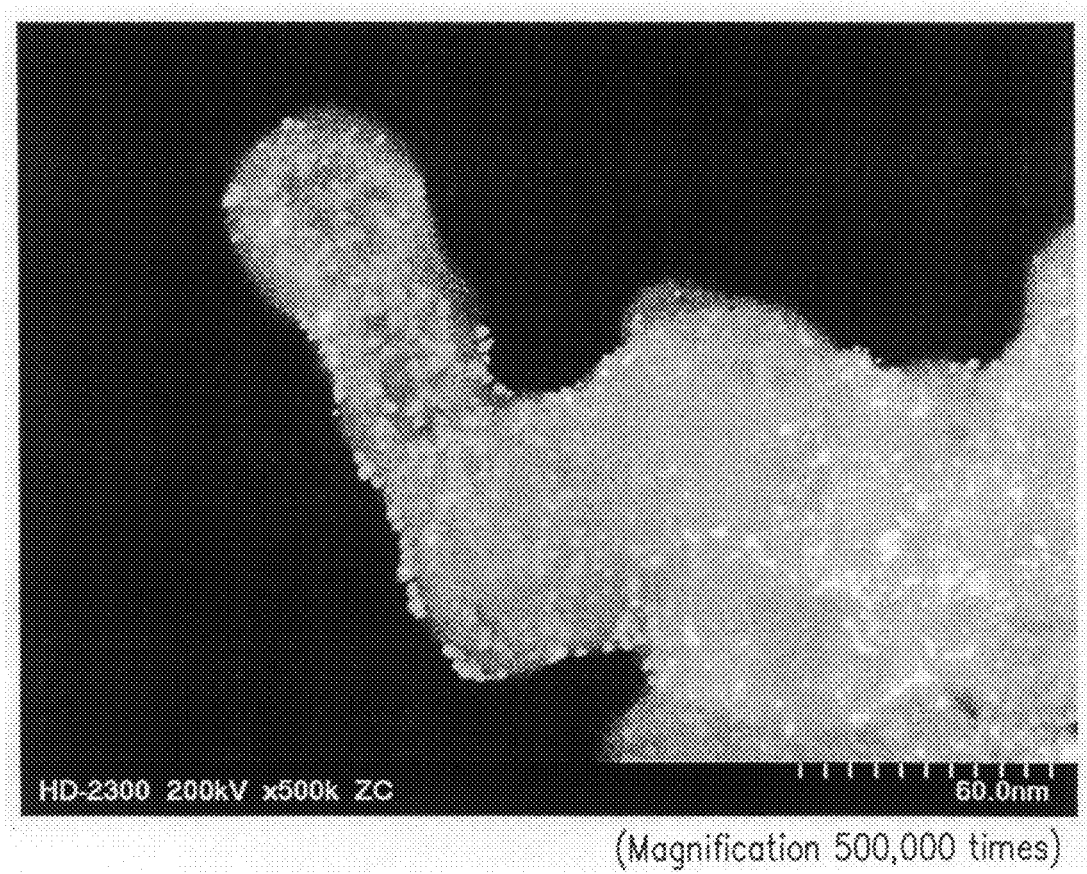
FIG. 7 is an electron micrograph showing a dispersion state of Pt-Fe alloy catalyst particles according to a third embodiment.
Figure 8:
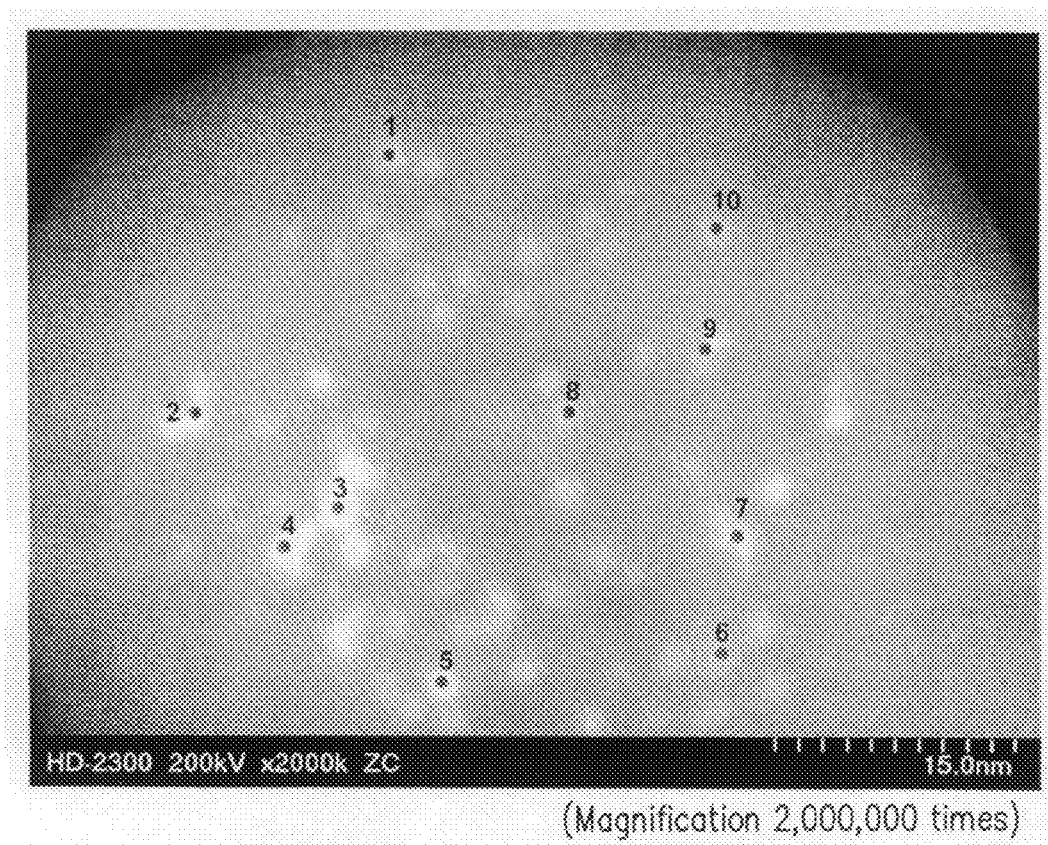
FIG. 8 is an electron micrograph showing an enlargement of FIG. 7.

FIG. 7 and FIG. 8 show the results of observing the dispersion state of the Pt—Fe alloy particles in Example 3 with a transmission electron microscope. As can be seen from these figures, the alloy particles are highly dispersed on the carrier and there is no width in the particle size distribution. FIG. 8 is a partial enlargement of FIG. 7, wherein a compositional analysis of Pt and Fe was performed for 10 particles with numbers shown by an energy dispersion type X-ray spectroscope. TABLE 4 shows the compositional ratio of Pt/Fe of the particles. The numbers in the tables correspond to the numbers shown in FIG. 8. As can be seen from TABLE 4, the proportion of Pt/Fe is a value close to Pt/Fe=50/50 which is the starting material ratio, and it is almost constant.

TABLE 4

|        | Fe (atom %) | Pt (atom %) |
| ------ | ----------- | ----------- |
| No. 1  | 58.11       | 41.89       |
| No. 2  | 49.60       | 50.40       |
| No. 3  | 58.92       | 41.08       |
| No. 4  | 53.09       | 46.91       |
| No. 5  | 59.03       | 40.97       |
| No. 6  | 62.39       | 37.61       |
| No. 7  | 57.11       | 42.89       |
| No. 8  | 61.31       | 38.69       |
| No. 9  | 52.08       | 47.92       |
| No. 10 | 54.24       | 45.76       |

Comparative Example

Hereafter, a comparative example will be given where a Pt—Fe alloy catalyst was prepared by alcohol reduction using the ordinary protective colloid method.

Figure 9:
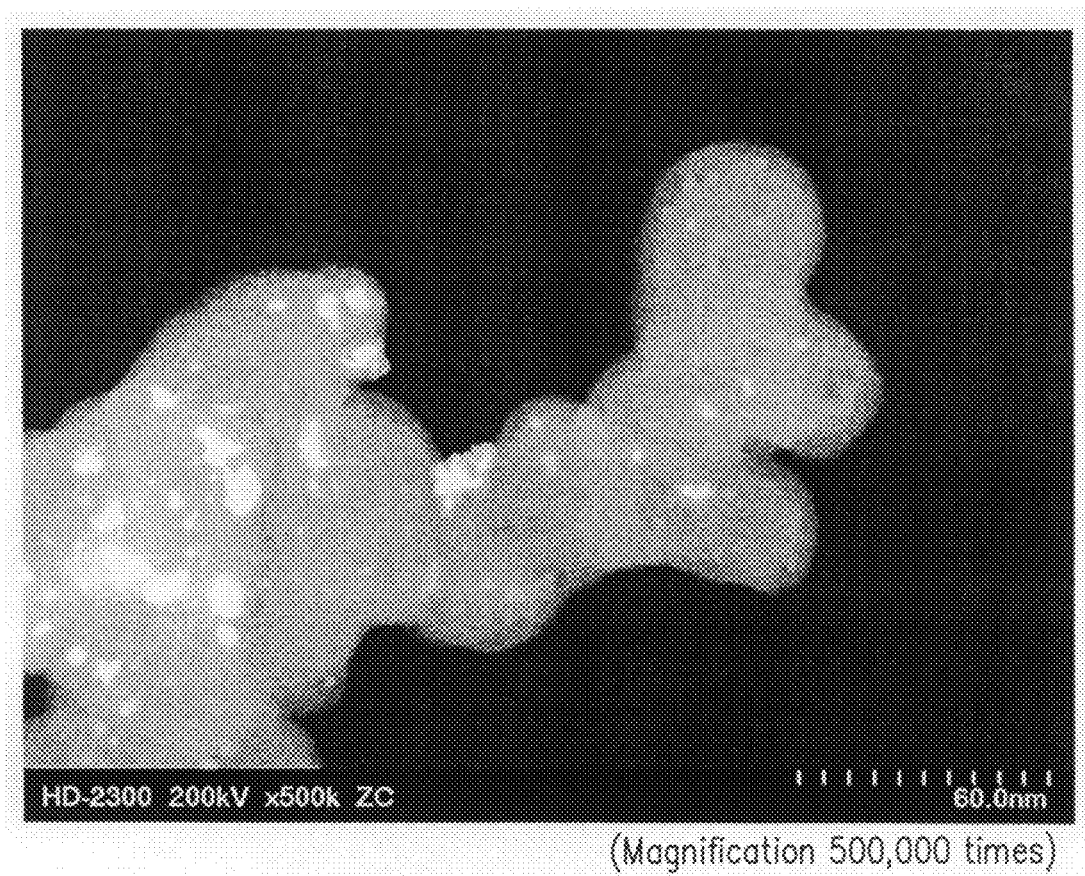
FIG. 9 is an electron micrograph showing a dispersion state of Pt-Fe alloy catalyst particles according to a comparative example.
Figure 10:
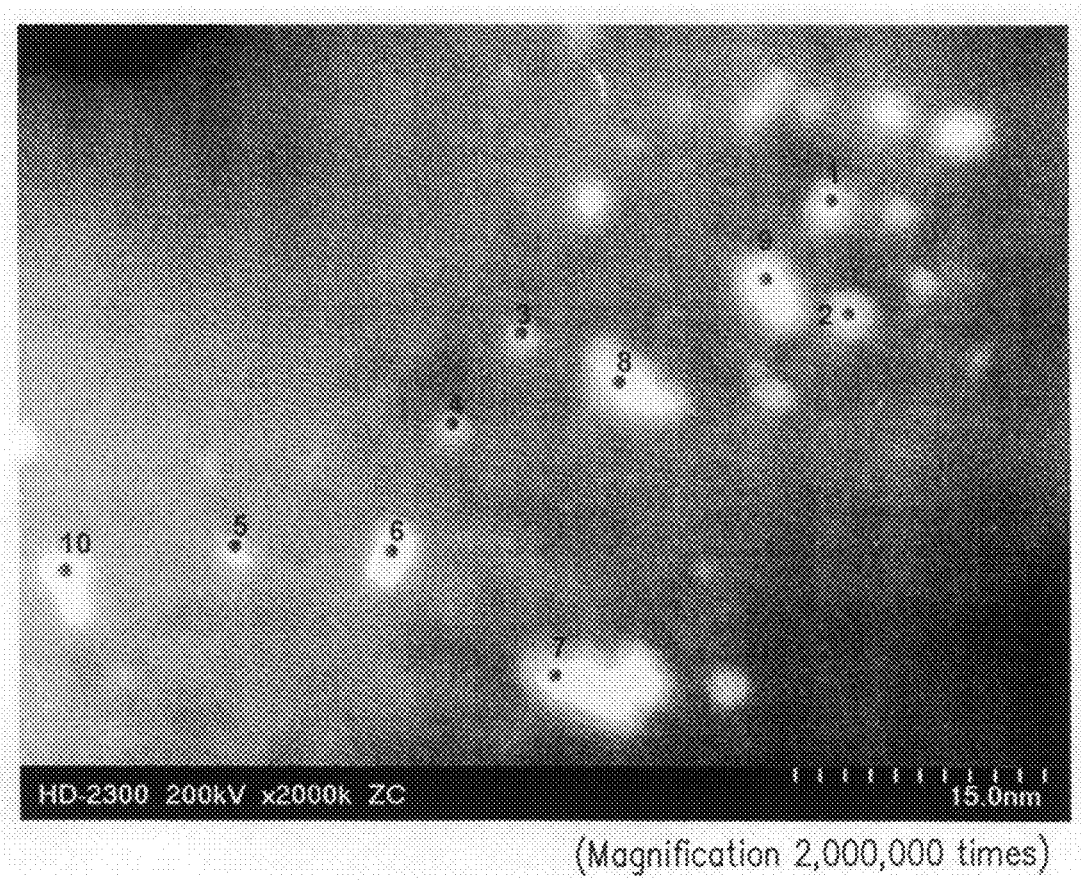
FIG. 10 is an electron micrograph showing higher magnification of FIG. 9.

2 g carbon black carrier, and 0.04 mol N-(3-aminopropyl) diethanolamine were dispersed in ethylene glycol. 2.1 mmol Fe(acac) and 2.1 mmol Pt(acac) dispersed in 100 ml ethylene glycol such that Pt/Fe=50/50 was added to the previous solution, and the mixture was refluxed at 200° C. for three hours in a nitrogen current. The obtained particles were filtered, and the Pt—Fe supported carbon particles were obtained. The alloy particles thus obtained were observed by a transmission electron microscope in the same way as in Example 3. FIG. 9 shows the dispersion state of the alloy particles at the same magnification as that of FIG. 7 in Example 3, and it is seen that particles have mutually coalesced to form clumps on the carrier, and their dispersion is poor. FIG. 10 is a partial enlargement of FIG. 9 in the same way as FIG. 8 in Example 3, and a compositional analysis of Pt and Fe was performed by X-ray diffraction analysis for 10 particles with numbers by an energy dispersion type X-ray spectroscope. TABLE 5 shows the compositional analysis results for the particles. The numbers in the table correspond to the numbers in FIG. 10. As can be seen from this table, the proportion of Pt/Fe has a large scatter and deviates largely from Pt/Fe=50/50 which are the starting material amounts.

TABLE 5

|        | Fe (atom %) | Pt (atom %) |
| ------ | ----------- | ----------- |
| No. 1  | 59.41       | 40.59       |
| No. 2  | 61.53       | 38.47       |
| No. 3  | 26.83       | 73.17       |
| No. 4  | 22.43       | 77.57       |
| No. 5  | 26.00       | 74.00       |
| No. 6  | 28.04       | 71.96       |
| No. 7  | 60.35       | 39.65       |
| No. 8  | 59.42       | 40.58       |
| No. 9  | 7.68        | 92.32       |
| No. 10 | 54.41       | 45.59       |

Next, regarding the electrode performance of the alloy particles in the comparative example, the activity control current density ($J_k$) was measured in the same way as in the aforesaid examples. The result was 180 mAcm$^{-2}$, which was a lower value than in the examples. This is because the dispersion state of the Pt—Fe alloy particles is poorer than for the catalyst in the examples, so the electrode performance is poor.

From the above results, comparing the example catalysts and comparative example catalyst, it was clear that particle size of the alloy particles in the former case was small, there was no width in the particle size distribution, and they were uniformly dispersed on the carrier. Also, the composition of the alloy particles was constant, showing that the example catalysts were superior to the latter case.

INDUSTRIAL APPLICABILITY

The invention provides a method for producing a superior electrocatalyst which can be used in fuel cells and the like, and therefore has wide industrial application.

The invention claimed is:

1. A method for producing an electrocatalyst, comprising the steps of:
preparing a reverse micelle solution by mixing two or more catalyst precursors selected from among metal salts and/or metal complexes, a solvent having hydrophilic groups and a non-aqueous solvent, in a state that the two or more catalyst precursors are mixed uniformly and enclosed together in single reverse micelles in the single reverse micelle solution; and
forming alloy particles from the two or more catalyst precursors selected from among metal salts and/or metal complexes in the reverse micelles by adding a reducing agent solution comprising $LiB(C_2H_5)_3H$ to said reverse micelle solution and heating to promote a reduction reaction;
after heating to promote the reduction reaction, treating the reverse micelles surrounding the alloy particles with a solvent comprising a lower alcohol to partially remove the reverse micelles;
uniformly supporting said alloy particles from which the reverse micelles are partially removed on a carrier; and
removing components of the reverse micelles from the alloy particles by heating the alloy particles supported uniformly on the carrier under an inert gas.

2. The method for producing an electrocatalyst according to claim 1, wherein said metal salt and metal complex contain a salt of a noble metal and base metal, and a metal complex of a noble metal and base metal.

3. The method for producing an electrocatalyst according to claim 2, wherein the noble metal contains platinum, palladium, rhodium, iridium, ruthenium or gold, the base metal is at least one metal selected from the group consisting of iron, tin, nickel, cobalt, manganese, chromium, vanadium, titanium, niobium, molybdenum, lead, and tungsten and the metal complex is at least one moiety selected from the group consisting of an amine complex, ethylene diamine complex and acetyl acetonate complex.

4. The method for producing an electrocatalyst according to claim 1, wherein said solvent having hydrophilic groups is a higher alcohol.

5. The method for producing an electrocatalyst according to claim 1, wherein said non-aqueous solvent is a higher ether.

6. The method for producing an electrocatalyst according to claim 1, wherein, in the step for preparing the reverse micelle solution, a higher aliphatic carboxylic acid and a higher aliphatic amine are mixed therewith.

7. The method for producing an electrocatalyst according to claim 1, wherein, in the step of forming the alloy particles from the two or more catalyst precursors selected from among metal salts and/or metal complexes in the reverse micelle by adding the reducing agent solution comprising $LiB(C_2H_5)_3H$ to said reverse micelle solution and heating to promote the reduction reaction, the heating temperature when promoting the reduction reaction is within a range of 200° C. to 300° C.

8. The method for producing an electrocatalyst according to claim 1, wherein the heating of alloy particles supported on the carrier to remove components of the reverse micelles therefrom is performed at 100° C. to 400° C.

9. The method for producing an electrocatalyst according to claim 1, wherein, in the step of preparing the reverse micelle solution, mixing the two or more catalyst precursors selected from among metal salts and/or metal complexes in a desired ratio in the single reverse micelle solution causes a compositional ratio of the alloy particles formed in the reverse micelle to correspond to a mixing ratio of the two or more catalyst precursors mixed in the single reverse micelle solution.

10. A method for producing an electrocatalyst, comprising the steps of:
preparing a reverse micelle solution containing a carrier by mixing two or more catalyst precursors of metal salts and/or metal complexes, a solvent having hydrophilic groups, a non-aqueous solvent and the carrier, in a state that the two or more catalyst precursors are mixed uniformly and enclosed together in single reverse micelles in the single reverse micelle solution;
forming alloy particles from the two or more catalyst precursors selected from among metal salts and/or metal complexes in the reverse micelles by adding a reducing agent solution comprising $LiB(C_2H_5)_3H$ to said reverse micelle solution and heating to promote a reduction reaction, and uniformly supporting the alloy particles surrounded by the reverse micelles on the carrier; and
removing components of the reverse micelles from the alloy particles by heating the alloy particles supported uniformly on the carrier under an inert gas.

11. The method for producing an electrocatalyst according to claim 10, wherein said metal salt and metal complex contain a salt of a noble metal and base metal, and a metal complex of a noble metal and base metal.

12. The method for producing an electrocatalyst according to claim 11, wherein the noble metal contains platinum, palladium, rhodium, iridium, ruthenium or gold, the base metal is at least one metal selected from the group consisting of iron, tin, nickel, cobalt, manganese chromium, vanadium, titanium, niobium, molybdenum, lead and tungsten, and the metal complex is at least one moiety selected from the group consisting of an amine complex, ethylene diamine complex and acetyl acetonate complex.

13. The method for producing an electrocatalyst according to claim 10, wherein said solvent having hydrophilic groups is a higher alcohol.

14. The method for producing an electrocatalyst according to claim 10, wherein said non-aqueous solvent is a higher ether.

15. The method for producing an electrocatalyst according to claim 10, wherein, in the step for preparing the reverse micelle solution, a higher aliphatic carboxylic acid and a higher aliphatic amine are mixed therewith.

16. The method for producing an electrocatalyst according to claim 10, wherein, in the step of forming the alloy particles from the two or more catalyst precursors selected from among metal salts and/or metal complexes in the reverse micelle by adding the reducing agent solution comprising $LiB(C_2H_5)_3H$ to said reverse micelle solution and heating to promote the reduction reaction, the heating temperature when promoting the reduction reaction is within a range of 200° C. to 300° C.

17. The method for producing an electrocatalyst according to claim 10, wherein the heating of the alloy particles supported on the carrier to remove components of the reverse micelles therefrom is performed at 100° C. to 400° C.

18. A method for producing an electrocatalyst, comprising:
preparing a reverse micelle solution by mixing two or more catalyst precursors selected from among metal salts and/or metal complexes, a solvent having hydrophilic groups and a non-aqueous solvent, in a state that the two or more catalyst precursors are mixed uniformly and enclosed together in single reverse micelles in the single reverse micelle solution;
forming alloy particles from the two or more catalyst precursors selected from among metal salts and/or metal complexes in the reverse micelles by adding a reducing agent solution comprising $LiB(C_2H_5)_3H$ to said reverse micelle solution and heating at 200° C. to 300° C. to promote a reduction reaction; and
after heating to promote the reduction reaction, separating and washing a deposit containing the alloy particles by mixing a solvent comprising a lower alcohol with the reverse micelles surrounding the alloy particles, and partially removing the components of the reverse micelles by redispersing the deposit in an organic solvent;
uniformly supporting said alloy particles from which the components of the reverse micelles are partially removed on a carrier; and
after the alloy particles are supported uniformly on the carrier, removing components of the remaining reverse micelles from the alloy particles by heating at 100° C. to 400° C. under an inert gas.

* * * * *

UNITED STATES PATENT AND TRADEMARK OFFICE
CERTIFICATE OF CORRECTION

PATENT NO. : 8,491,697 B2  
APPLICATION NO. : 11/664506  
DATED : July 23, 2013  
INVENTOR(S) : Watanabe et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this
Eighth Day of September, 2015

Michelle K. Lee
*Director of the United States Patent and Trademark Office*